June 17, 1941. R. ANXIONNAZ 2,245,954
GAS TURBINE ENGINE PLANT
Filed Jan. 24, 1938 2 Sheets-Sheet 1

Inventor
René Anxionnaz
By Watson, Cole, Morse & Grindle
Attorneys

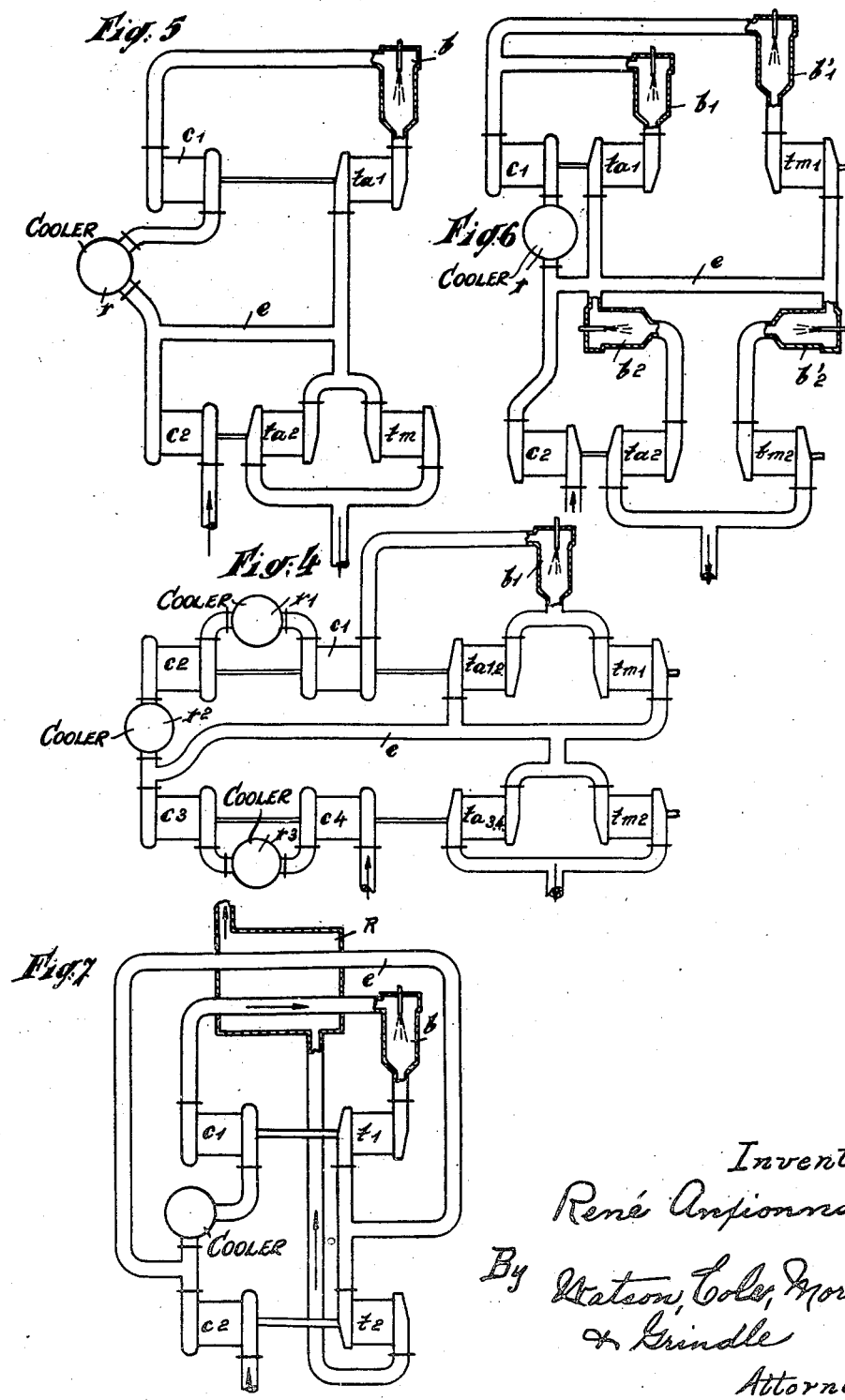

Patented June 17, 1941

2,245,954

UNITED STATES PATENT OFFICE 2,245,954

GAS TURBINE ENGINE PLANT

René Anxionnaz, Paris, France, assignor of one-half to Societe Rateau, Paris, France, a company of France Application January 24, 1938, Serial No. 186,747
In France January 25, 1937

9 Claims. (Cl. 60—41)

The present invention relates to gas turbine plants including at least two stages of compression in series and at least two stages of gas turbines in series.

The chief object of the present invention is to improve the operation and the efficiency of a gas turbine plant of the type including at least two stages of compression in series and at least two stages of gas turbines in series, no matter whether the compressors are all driven by the same turbine or not.

The essential feature of the present invention consists in providing one or several balancing conduits connecting one or several stages of compression with the respective stage or stages of expansion (turbines) which are of equivalent pressure under normal working conditions of the system. Said balancing conduits operate automatically on the one hand to correctly distribute the air feed to the compressor stages and on the other hand to correctly distribute the powers between the turbine stages, when the load of the plant varies.

Preferred embodiments of the present invention will be hereinafter described, with reference to the accompanying drawings, given merely by way of example, and in which:

Fig. 4 shows a modification in which the number of compressors coupled in series is not equal to the number of turbines coupled in series;

Fig. 5 shows another modification;

Fig. 6 shows a modification including a heating burner in one of the expansion stages;

Fig. 7 is a diagrammatical view showing an embodiment including a recuperator.

Figure 1:
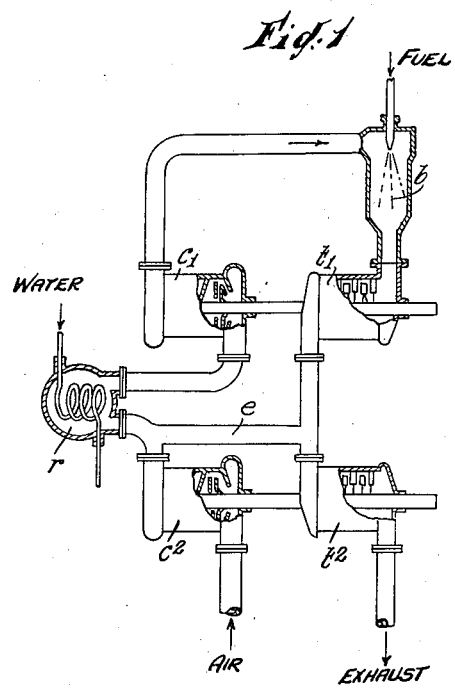
Fig. 1 is a diagrammatical view of a plant according to the present invention including two compressors in series, associated with two gas turbines in series.

In Fig. 1, I have shown at $c_1$ and $c_2$ two compressors connected in series and driven in any suitable manner ($r$ being a refrigerating device for cooling air between the two compression stages). Reference character $b$ designates a burner heating compressed air from the compressors through the internal combustion of a liquid fuel; $t_1$ and $t_2$ designate two turbines connected in series. According to the invention, a conduit $e$ interconnects the pipe leading from one compressor to the other and the pipe leading from one turbine to the other one, in such manner as to balance the pressures in said pipes.

The whole having been devised for working at full load with a given ratio of compression, when it is desired to work at a lower rate, the ratio of compression decreases, and therefore, if the balancing conduit $e$ did not exist, the volume of air handled by the high pressure compressor $c_1$ would increase comparatively with the volume of air handled by the low pressure compressor $c_2$ and the adaptation of one or the other of these compressors would become defective.

But with the arrangement according to the present invention, a certain amount of air passes through the balancing conduit $e$ after having passed through the low pressure compressor $c_2$ and it feeds directly the low pressure turbine $t_2$, after having undergone, if necessary, the suitable reheating operations. Consequently, it will be readily understood that the volume of air flowing through the second compressor $c_1$ can be brought back to the proper value in comparison with the volume of air flowing through the first compressor $c_2$, whereby it is possible to maintain a correct adaptation of both of the compressors, even if they are keyed on a common driving shaft.

The working of the balancing conduit $e$ is automatically maintained, without it being necessary to make use of any control or regulation member.

This automatic regulation results from the fact that the compressors that are normally used in combination with gas turbines (centrifugal or axial blowers) have a downwardly inclined characteristic curve, that is to say the pressure they supply decreases when the output increases. It follows that, when the load of the plant drops, as the output of the high pressure compressor $c_1$ tends to increase comparatively with that of the low pressure compressor $c_2$ the pressure it supplies tends to decrease with respect to that supplied by the low pressure compressor $c_2$. Therefore, if the intermediate pressure between the compressors was for instance the average of the inlet and outlet pressure it would now be higher than the average.

On the other hand, considering the two turbines $t_1$, $t_2$ coupled together in series, it is known that when the inlet pressure decreases the drop of pressure in the low pressure turbine $t_2$ decreases quicker than that in the high pressure turbine $t_1$. The intermediate pressure between the two turbines will therefore tend to decrease with respect to the intermediate pressure between the two compressors and the air flow spontaneously through the balancing conduit $e$.

It is possible to determine the relative dimensions of the various machines and of the conduit in such manner that the quantity of air flowing through the balancing pipe automatically adjusts itself to the exact value which ensures the optimum adaptation of the various stages of compressors for any load of the plant.

On the other hand, it is known that, when two or more gas turbines are coupled in series, the power they can respectively supply does not remain proportional to the initial value when the total output of the system varies.

Now, when the system is provided with the balancing conduit $e$, according to the present invention, at low load said conduits supply a certain amount of air from the low pressure compressor $c_2$ to the low pressure turbine $t_2$, so that said low pressure turbine receives a certain amount of supplementary air which has not flown through the high pressure turbine $t_1$. The power supplied by said low pressure turbine $t_2$ therefore tends to increase with respect to that of the high pressure turbine $t_1$, which compensates for the exaggerated drop of power which would occur otherwise.

If so desired, it is possible to determine the dimensions of the various machines and of the balancing conduits in such manner that the respective powers of the various turbines remain approximately proportional or that their ratio varies in a given manner when the total load varies.

Figure 2:
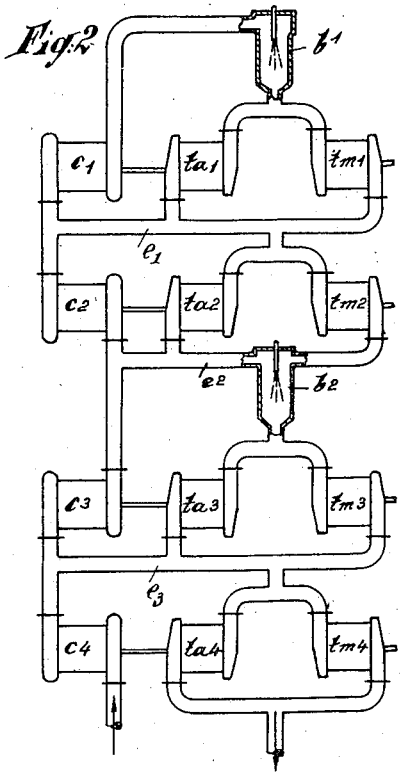
Fig. 2 is a diagrammatical view of a plant according to the invention in which compressors in series are driven by gas turbines also in series, said turbines being coupled in parallel with other turbines producing motive power.

The arrangement according to the present invention applies in particular to the case in which several compressors coupled in series are driven by the same number of gas turbines, also coupled in series, this plurality of turbines being itself coupled in parallel with a number of turbines producing the useful power. An embodiment of this kind is shown by Fig. 2. Compressors $c_1$, $c_2$, $c_3$, $c_4$, coupled together in series are driven by turbines $ta_1$, $ta_2$, $ta_3$, $ta_4$, mounted in series with one another and in parallel with the respective turbines $tm_1$, $tm_2$, $tm_3$, $tm_4$, which produce the power to be utilized. The intervals between the compressors on the one hand and the turbines on the other hand are respectively connected together by the balancing conduits $e_1$, $e_2$, $e_3$.

Between the high pressure compressor $c_1$ and the high pressure turbines $ta_1$, $tm_1$, the compressed air is heated in the chamber $b_1$ by combustion of liquid fuel in said chamber. Another combustion chamber $b_2$ is provided between the turbine stages $ta_2$, $tm_2$ and $ta_3$, $tm_3$, for the reheating of the air.

Figure 3:
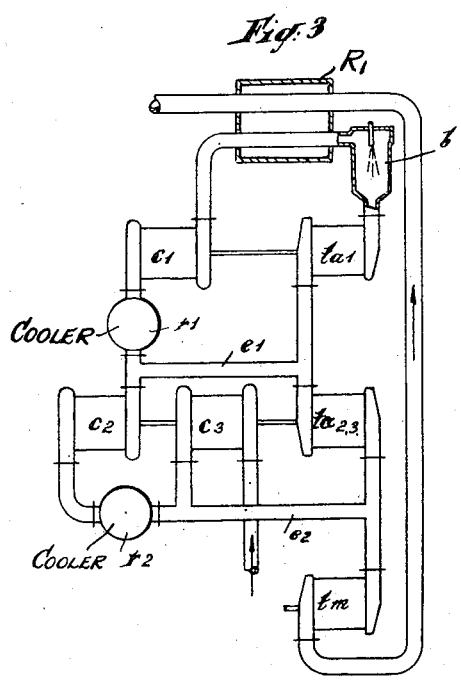
Fig. 3 shows a modification in which a plurality of gas turbines in series includes turbines for producing motive power and other turbines for driving the compressors.

The arrangement according to the present invention applies also to the case in which several compressors such as compressors $c_3$, $c_2$, $c_1$ (Fig. 3), some of which can be assembled on a common shaft (compressors $c_2$, $c_3$,) feed a system of gas turbines $ta_1$, $ta_{2.3.}$, $tm$ coupled in series with one another, some of these turbines supplying motive power, such as turbines $tm$ and the others driving the compressors ($ta_1$ and $ta_{2.3.}$).

The compressed air is cooled in refrigerating devices $r_1$ and $r_2$ mounted between the compressor stages and the air delivered by the high pressure stage is heated in the combustion chamber $b$.

A balancing conduit $e_1$ connects the interval between the compressors stages $c_2$, $c_1$ with the interval between the turbines stages $ta_1$, $ta_{2.3.}$. Another balancing conduit $e_2$ connects the interval between the compressor stages $c_3$ $c_2$ with the interval between the turbine stages $ta_{2.3.}$, $tm$. At normal load, the pressure existing in the interval between the compressor stages $c_2$, $c_1$ is equal to the pressure existing between the turbine stages $ta_1$, $ta_{2.3.}$ and no air flows through the conduit $e_1$.

When the load of the plant drops, the pressure between $c_2$ and $c_1$ becomes higher than the pressure between $ta_1$ and $ta_{2.3.}$ and consequently a certain amount of air flows automatically through the conduit $e_1$. Said amount adjusts itself to the diminution of the load. The operation of the balancing conduit $e_2$ is the same. If desired, the gas from the compressor $c_1$ may be passed through a recuperator $R_1$ before reaching the burner $b$.

It is not necessary that the number of compressors coupled in series should be equal to the number of turbines coupled in series; it is sufficient to choose, for connecting them together, the stage of compression and the stage of expansion the pressures of which correspond to each other. For instance, in the embodiment shown in Fig. 4, use is made of four stages of compression $c_1$, $c_2$, $c_3$, $c_4$ and two turbines ($ta_{1.2.}$ and $ta_{3.4.}$) for driving said compressors, the turbines $tm_1$ and $tm_2$, coupled in parallel relation with the turbines $ta_{1.2.}$ and $ta_{3.4.}$ respectively, supplying motive power and being fed, like the turbines $ta_{1.2.}$ and $ta_{3.4.}$, with the compressed air which has been heated in the combustion chamber $b_1$. The interval stage $c_2$ can be connected to the interval between the two groups of turbines $ta_{1.2.}$, $tm_1$ and $ta_{3.4.}$, $tm_2$, by means of a balancing conduit $e$, if the pressures in said intervals have equal values at normal load. The balancing conduit $e$ works in the manner above described.

The balancing conduit according to the present invention can also be inserted between any two consecutive stages of the compressor in the same compressor casing or body. In a likewise manner, this conduit can open into the interval between two consecutive stages in the casing or body of a turbine.

In the embodiment shown in Fig. 5 some of the turbines, such as turbines $ta_2$ and $tm$, are coupled in parallel together and the whole of said turbines is coupled in series with the other part of the system of turbines, such as turbine $ta_1$. A balancing conduit $e$ connects the interval between the compressors $c_2$ and $c_1$ with the interval between the group of parallel turbines $ta_2$, $tm$ and the other turbine $ta_1$.

The balancing conduits apply also to a system of turbines including either a single burner for the heating of the gases, or several burners heating different portions of the gases or reheating them after partial expansion in turbines. In the embodiment shown in Fig. 6, the turbines $ta_1$ and $ta_2$ driving the compressors $c_1$ and $c_2$ are mounted in series together, but in parallel with the turbines $tm_1$ and $tm_2$ supplying motive power and coupled in series together.

Before the turbines $ta_1$ and $tm_1$ the compressed air is heated in the combustion chambers $b_1$ and $b'_1$. In the intervals between the turbines stages the air is reheated in the combustion chambers $b_2$ and $b'_2$. Said intervals are connected to the interval between the compressor stages $c_2$, $c_1$ by means of the balancing conduit $e$, ahead of the combustion chambers $b_2$ and $b'_2$, in such manner that the air that flows through said conduit is also heated by said burners.

It is also possible to place the burner in the balancing conduit itself, but this arrangement is not advisable because the amount of air which flows in this case through the burner is greater at low load than at high load, and it might even come to nought at the highest load, which is generally contrary to a good use of the burner.

Further, the balancing conduits according to the present invention can be employed whether the system of turbines includes a heat recuperator or whether it does not include one.

If such a recuperator exists I may, preferably, cause to pass through the recuperator (or through a distinct recuperator) the air flowing through the balancing conduit, in order to heat said air before employing it in the expansion circuit. This flow of air through the recuperator can take place whether said air is subsequently fed to an intermediate burner or not. In the embodiment shown in Fig. 7, turbines $t_1 t_2$ and compressors $c_1 c_2$ are coupled as above described with reference to Fig. 1. The exhaust gases flow through the heat recuperator R in which the compressed air is preheated before its admission in the combustion chamber $b$. According to the invention, the balancing conduit $e$ passes through the recuperator R in such manner that the air flowing through said conduit is heated by the exhaust gases.

It has been pointed out above that at normal or full load, the pressures are the same at the two ends of the balancing conduit and that consequently no air flows therethrough, while, at low load, the pressure at the end of this by-pass conduit adjacent the compression stages is greater than at the end adjacent the turbine stages so that air flows through the conduit from the compressors to the turbines. Generally, full load or normal load is not to be exceeded but in order to prevent reverse flow in the balancing conduit, a check valve may be inserted.

In a general manner, while I have, in the above description, disclosed what I deem to be practical and efficient embodiments of the present invention, it should be well understood that I do not wish to be limited thereto as there might be changes made in the arrangement, disposition, and form of the parts without departing from the principle of the present invention as comprehended within the scope of the accompanying claims.

What I claim is:

1. A gas turbine plant which comprises, in combination, at least two independently rotating turbines arranged in series, a conduit interconnecting said turbines, at least two compressors for the feed of compressed air to said turbines, driven by at least one of said turbines, a conduit interconnecting said compressors in series, said turbines and compressors being so constructed that under normal externel load, the pressure existing in the first mentioned conduit is equal to the pressure existing in the second mentioned conduit, a third conduit connecting the outlet of said pair of compressors with the inlet of said pair of turbines, means in said third conduit for heating the compressed air by combustion of fuel, and a balancing conduit directly connecting said second mentioned conduit with said first mentioned conduit.

2. A gas turbine plane which comprises, in combination, at least two independently rotating turbines arranged in series, a conduit interconnecting said turbines, at least two compressors for the feed of compressed air to said turbines, driven by at least one of said turbines, a conduit interconnecting said compressors in series, said turbines and compressors being so constructed that, under normal external load, the pressure existing in the first mentioned conduit is equal to the pressure existing in the second mentioned conduit, a third conduit connecting the outlet of said pair of compressors to the inlet of said pair of turbines, means in said third conduit for heating the compressed air flowing therethrough, by combustion of fuel, and a balancing conduit directly connecting in an uninterrupted manner said second mentioned conduit with said first mentioned conduit.

3. A gas turbine plant which comprises, in combination, at least two independently rotating turbines arranged in series, a conduit interconnecting said turbines, at least two compressors for the feed of compressed air to said turbines, driven by at least one of said turbines, a conduit interconnecting said compressors in series, said turbines and compressors being so constructed that, under normal external load, the pressure existing in the first mentioned conduit is equal to the pressure existing in the second mentioned conduit, a third conduit connecting the outlet of said pair of compressors to the inlet of said pair of turbines, means in said third conduit for heating, by combustion of fuel, the air flowing therethrough, a balancing conduit connecting in an uninterrupted manner said second mentioned conduit with said first mentioned conduit, a chamber surrounding both of the third mentioned conduit and said balancing conduit, and means for circulating the exhaust gases from said pair of turbines through said chamber.

4. A gas turbine plant which comprises, in combination, at least two independently rotating turbines arranged in series, a conduit interconnecting said turbines, at least two compressors for the feed of compressed air to said turbines, driven by at least one of said turbines, a conduit interconnecting said compressors in series, said turbines and compressors being so constructed that, under normal external load conditions, the pressure existing in the first mentioned conduit is equal to the pressure existing in the second mentioned conduit, a third conduit connecting the outlet of said pair of compressors with the inlet of said pair of turbines, means in said third conduit for heating, by combustion of fuel, the air flowing therethrough, a balancing conduit connecting in an uninterrupted manner said second mentioned conduit with said first mentioned conduit, heating jacket means surrounding said balancing conduit and a portion of said third mentioned conduit located between the outlet of said pair of compressors and the first mentioned heating means, and means for feeding the exhaust gases from said pair of turbines to said heating jacket means.

5. A gas turbine plant which comprises, in combination, at least two independently rotating turbines arranged in series, a conduit interconnecting said turbines, at least two compressors for the feed of compressed air to said turbines, driven by said turbines, respectively, a conduit interconnecting said compressors in series, said turbines and compressors being so constructed that, under normal external load conditions, the pressure existing in the first mentioned conduit is equal to the pressure existing in the second mentioned conduit, a third conduit connecting the outlet of said pair of compressors with the inlet of said pair of turbines, means in said third conduit for heating the compressed air flowing therethrough, by combustion of fuel, and a balancing conduit directly connecting said second mentioned conduit with said first mentioned conduit.

6. A gas turbine plant which comprises, in combination, at least two independently rotating turbines arranged in series, a conduit interconnecting said turbines, at least two compressors for the feed of compressed air to said turbines, driven by said turbines, respectively, a conduit interconnecting said compressors in series, said turbines and compressors being so constructed that, under normal external load conditions, the pressure existing in the first mentioned conduit is equal to the pressure existing in the second mentioned conduit, a third conduit connecting the outlet of said pair of compressors with the inlet of said pair of turbines, means in said third conduit for heating, by combustion of fuel, the compressed air flowing therethrough, and a balancing conduit directly connecting in an uninterrupted manner said second mentioned conduit with said first mentioned conduit.

7. A gas turbine plant which comprises, in combination, at least two independently rotating turbines arranged in series, a conduit interconnecting said turbines, at least two compressors for the feed of compressed air to said turbines, driven by said turbines, respectively, a conduit interconnecting said compressors in series, said turbines and compressors being so constructed that under normal external load conditions, the pressure existing in the first mentioned conduit is equal to the pressure existing in the second mentioned conduit, a third conduit connecting the outlet of said pair of compressors with the inlet of said pair of turbines, means in said third conduit for heating, by combustion of fuel, the air flowing therethrough, a balancing conduit connecting directly in an uninterrupted manner said second mentioned conduit with said first mentioned conduit, a chamber surrounding both of said third mentioned conduit and said balancing conduit, and means for circulating exhaust gases from said pair of turbines through said chamber.

8. A gas turbine plant which comprises, in combination, at least two independently rotating turbines arranged in series, a conduit interconnecting said turbines, at least two compressors for the feed of compressed air to said turbines, driven by said turbines, respectively, a conduit interconnecting said compressors in series, said turbines and compressors being so constructed that, under normal external load conditions, the pressure existing in the first mentioned conduit is equal to the pressure existing in the second mentioned conduit, a third conduit, connecting the outlet of said pair of compressors with the inlet of said pair of turbines, means in said third conduit for heating, by combustion of fuel, the air flowing therethrough, a balancing conduit connecting directly in an uninterrupted manner the second mentioned conduit with the first mentioned conduit, heating jacket means surrounding said balancing conduit and a portion of said third mentioned conduit located between the outlet of said pair of compressors and the first mentioned heating means, and means for feeding the exhaust gases from said pair of turbines to said heating jacket means.

9. A gas turbine plant which comprises, in combination, at least two independently rotating turbines arranged in series, a conduit interconnecting said turbines, at least two compressors for the feed of compressed air to said turbines, arranged in series, a conduit interconnecting said compressors, a third conduit connecting the outlet of the second compressor with the inlet of the first turbine, means in said third conduit for heating, by combustion of fuel, the compressed air flowing through therethrough, mechanical means for coupling the first compressor with the second turbine, mechanical means for coupling the second compressor with the first turbine, said turbines and compressors being so constructed that, under normal external load conditions, the pressure existing in the first mentioned conduit is equal to the pressure existing in the second mentioned conduit, and a balancing conduit directly connecting said second mentioned conduit with said first mentioned conduit.

RENÉ ANXIONNAZ.